United States Patent
Gibson

(10) Patent No.: US 7,066,046 B1
(45) Date of Patent: Jun. 27, 2006

(54) METHOD FOR MAKING SPEED REDUCERS

(76) Inventor: Randolph P. Gibson, 2668 Waxwood Ct., Clearwater, FL (US) 33761

( * ) Notice: Subject to any disclaimer, the term of this patent is extended or adjusted under 35 U.S.C. 154(b) by 449 days.

(21) Appl. No.: 10/248,840

(22) Filed: Feb. 24, 2003

(51) Int. Cl.
*F16H 1/16* (2006.01)

(52) U.S. Cl. .................... 74/425; 74/606 R

(58) Field of Classification Search ............ 74/606 R, 74/425, 416, 412 R
See application file for complete search history.

(56) References Cited

U.S. PATENT DOCUMENTS

| | | | | |
|---|---|---|---|---|
| 3,656,356 A | * | 4/1972 | Gubbiotti | 74/63 |
| 4,023,433 A | * | 5/1977 | Schutz | 74/425 |
| 5,056,213 A | * | 10/1991 | Behnke et al. | 29/596 |
| 5,992,259 A | * | 11/1999 | Fleytman | 74/425 |

FOREIGN PATENT DOCUMENTS

| | | | |
|---|---|---|---|
| DE | 196 13 814 | * | 9/1997 |
| JP | 05302649 | * | 11/1993 |

* cited by examiner

*Primary Examiner*—David M. Fenstermacher
(74) *Attorney, Agent, or Firm*—Ronald E. Smith; Smith & Hopen, P.A.

(57) ABSTRACT

A CNC machine makes a single speed reducer by forming a worm recess, a worm gear recess, and a worm shaft groove that is discontinuous at the worm recess in a first solid block of aluminum. Matching recesses and grooves are formed in a second solid block of aluminum in the same way so that a worm cavity, a worm gear cavity, and a worm shaft bore are formed when the two blocks are placed in juxtaposition to one another. The worm shaft bore enables the reducer to have two different mounting configurations. A double speed reducer made by the same techniques has even more mounting configurations. The design also minimizes gear lash, end play, and inertia generated coasting and accommodates power transmission systems other than gear trains.

7 Claims, 11 Drawing Sheets

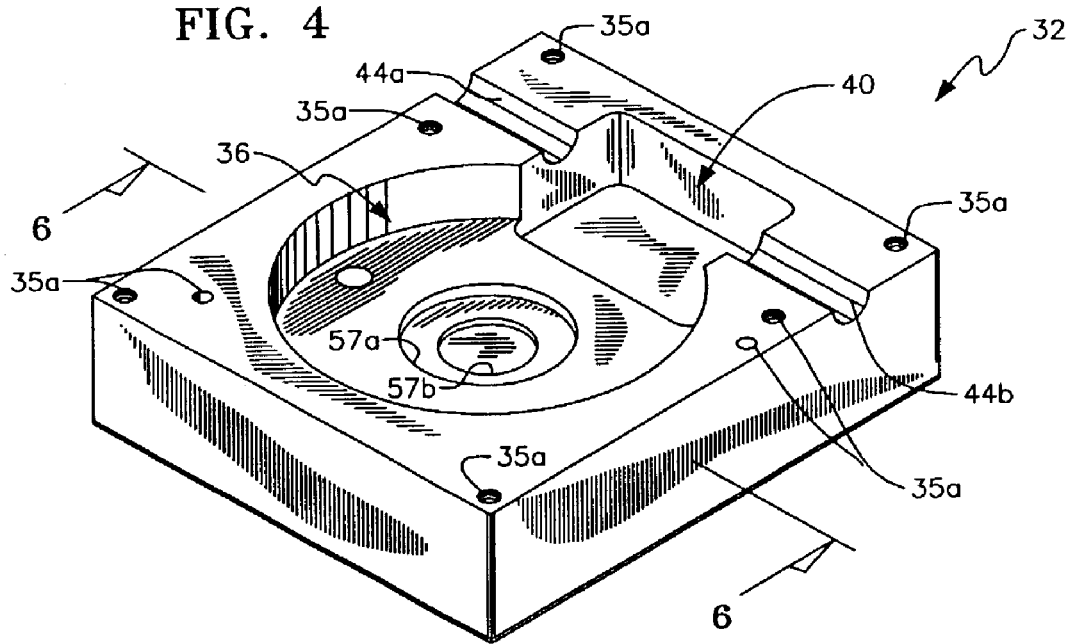
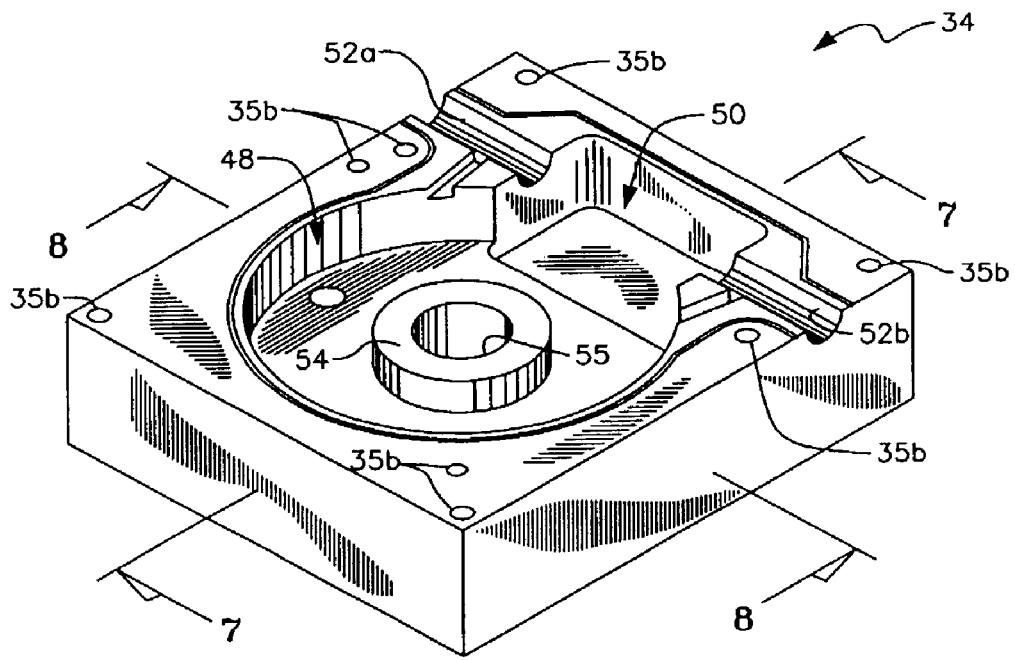

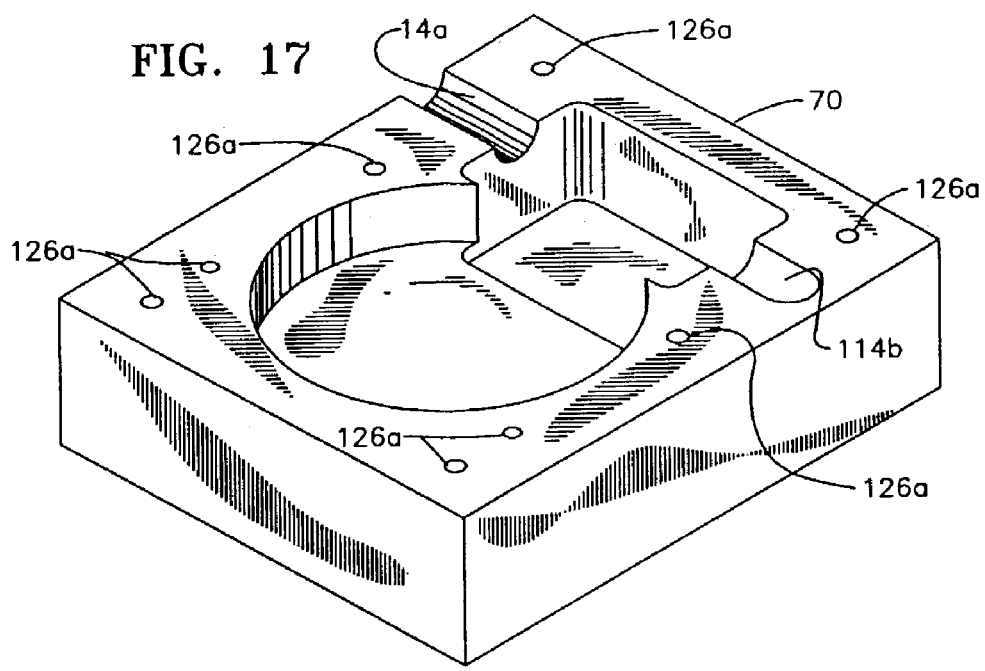
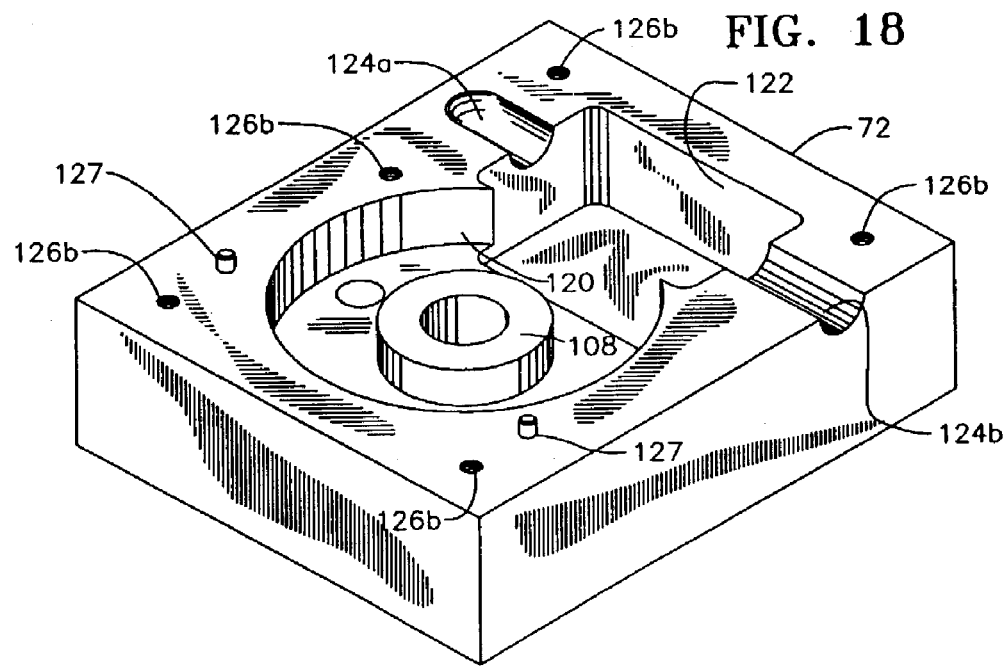

METHOD FOR MAKING SPEED REDUCERS

BACKGROUND OF INVENTION

1. Field of the Invention

This invention relates, generally, to speed reducers. More particularly, it relates to a method for making speed reducers from solid metallic blocks by CNC machining.

2. Description of the Prior Art

The conventional way to make a speed reducer is to cast the individual parts thereof in a mold. The parts that are individually cast include the housing and the gears or other power transmission means within the housing. The working parts of the speed reducer are assembled and the completed assembly is placed into the housing.

The housing is typically a box-like structure that encloses the gear train or other power transmission system. The housing not only protects the parts therewithin from the elements, it also acts as a safety cover to protect individuals from sprocket gears, sprocket chains, and the like that may form a part of the speed reducer.

Worms and worm gears are well-suited for use in speed reducers, but there are many other types of gears that can be used. For example, helical, bevel, mitre, and spur gears or any combination thereof can be used.

Nor are gears the only suitable means for performing lifting functions. For example, there are numerous hydraulic, pneumatic, and other power transmission systems that can be employed. However, in most applications a gear train is less expensive and usually more practical than such alternatives.

Speed reducers of the type that employ worms and worm gears have distinct advantages over other gear train power transmission systems. They have particular utility where a high-ratio speed reduction is required but where space is limited. They operate quieter and smoother than speed reducers employing sprocket gears and sprocket chains, helical gear trains, and the like.

Speed reducers that incorporate worms and worm gears also offer good resistance to back driving because a worm gear cannot drive its associated worm. When properly designed and installed for a particular application, they are generally self-locking when the load is at rest. For example, where a boat is lifted from water by a lift that incorporates a worm and worm gear speed reducer, the worm and worm gear speed reducer will self-lock and thus prevent the boat from re-entering the water. When a boat is being lowered, any tendency for lowering to continue after the motor has been turned off is called "inertia-generated coasting." Worm and worm gear speed reducers are resistant to such inertia-generated coasting.

A worm and worm gear double speed reduction system is even more resistant to inertia-generating coasting, making such systems preferable to other gear systems when used for lifting and lowering heavy loads.

For example, spur gears exhibit little or no resistance to inertia-generated coasting and thus are not suitable for use in applications requiring the lifting of heavy objects where inertia-generated coasting is undesirable.

The success of a design is determined in large part by the gear material selected. For example, a system having steel worms and cast iron worm gears has only half the lifting capacity as a system having hardened steel worms and bronze worm gears.

The designer must also consider the amount of motion between the worm and the worm gear, also known as gear lash, and the lateral motion of the worm, also known as end play.

Moreover, appropriate thrust bearings and lubrication are critical to minimize unwanted friction to ensure efficient operation.

A weight-lifting and holding system is said to have a service factor of 1.0 if the system is subjected to a moderate shock lasting no more than fifteen (15) minutes for each two (2) hour period of uniform operation over a ten (10) hour or less day. A service factor of 1.0 or less is considered normal for the boatlift industry. It follows that a successful design should employ a worm and worm gear speed reducer having a hardened steel worm and a bronze worm gear, should minimize gear lash and end play, and should be installable in small spaces. Ideally, the design should enable the speed reducer to be re-configured as needed so that it can fit into differing areas having limited space.

An ideal design should also maintain the designed gear lash and end play with consistent repeatability, i.e., the gear lash and end play should remain about the same over many cycles of operation.

The known methods for making speed reducers, including the casting of individual parts as mentioned above, assembling the parts, and housing the assembled parts, is a relatively expensive process. If a new method could be found that substantially reduces the cost of manufacturing a speed reducer, it would revolutionize the industry.

However, in view of the prior art considered as a whole at the time the present invention was made, it was not obvious to those of ordinary skill in the pertinent art how the art of making a speed reducer could be advanced in a pioneering way.

SUMMARY OF INVENTION

The long-standing but heretofore unfulfilled need for an improved method for manufacturing a speed reducer is now met by a new, useful, and nonobvious invention.

In a first embodiment, a novel single speed reducer is manufactured from a first solid block of metallic construction and a second solid block of metallic construction having a common width, height, and thickness as the first solid block.

A first plurality of recesses is formed in the first solid block and a second plurality of mating recesses is formed in the second solid block by a CNC machine. When the first and second solid blocks are placed in confronting relation to one another, the union of the first and second pluralities of recesses forms a plurality of cavities that accommodate the various parts of a power transmission system. Thus, the first solid block and the second solid block form a speed reducer housing when disposed in confronting relation to one another.

The use of a CNC machine to form a plurality of mating recesses in a pair of metallic blocks to form a plurality of cavities adapted to accommodate the parts of a power transmission system is the primary teaching of the present invention. The recesses can be machined with precision so that the respective positions of the parts of the power transmission system can be precisely maintained against slippage, migration, and the like. For example, where a worm and worm gear power transmission is employed, gear lash and end play are tightly controlled.

Any type of power transmission system capable of lifting a heavy weight, of self-locking, and that is resistance to inertia-generated coasting may be positioned within the power transmission cavity and the novel method is not limited to power transmission systems of the type employing gear trains.

In a preferred embodiment, the power transmission system includes a worm and worm gear arrangement because of the low cost and practicality of such arrangements. However, the primary point of novelty of the present invention lies not in the use of worm and worm gear arrangements as the power transmission system, but in the use of a CNC machine to form first and second recesses in first and second metallic blocks, respectively, that collectively form a power transmission-receiving cavity when the first and second metallic blocks are placed into confronting relation to one another.

Where a worm and worm gear power transmission system is employed, the worm is mounted on a worm shaft. A worm-receiving cavity, hereinafter referred to as a worm cavity, is formed in the speed reducer housing. Similarly, a worm gear-receiving cavity, hereinafter referred to as a worm gear cavity, is formed in the speed reducer housing and a worm shaft-receiving bore, hereinafter referred to as a worm shaft bore, is also formed in said speed reducer housing.

The worm gear is mounted on a worm gear shaft and a worm gear shaft opening is formed in the second solid block to receive the worm gear shaft.

The worm shaft bore is discontinuous at the worm cavity. The worm shaft bore has a first part extending from the worm cavity to a first edge wall of the speed reducer housing and has a second part extending from the worm cavity to an opposed, second edge wall of the speed reducer housing.

A worm shaft is positioned in the worm shaft bore. In a first configuration, a first end of the worm shaft extends from the first edge wall of the speed reducer housing and in a second configuration, the first end of the worm shaft extends from the second edge wall of the speed reducer housing.

An outer end of the worm shaft is adapted to engage an output shaft of a motor means so that the output shaft rotates the worm shaft and hence the worm, and the worm rotates the worm gear and hence the worm gear shaft.

The worm cavity, the worm gear cavity, the worm shaft bore, and the worm gear shaft opening are each formed by a CNC machine-controlled milling process. Each cavity is a recess in the first or second metallic blocks, and confronting recesses collectively form a cavity.

Fastening means are provided for maintaining the first and second solid blocks in confronting relation to one another. The fastening means includes a first plurality of fastening bores formed in the first solid block and a second plurality of fastening bores formed in the second solid block. Fastener pins having their respective opposite ends press fit into said fastening bores align the first and second solid blocks and secure them to one another. The first and second plurality of fastening bores are formed by a computer-controlled milling process.

Gear lash and end play are controlled because the worm cavity is only slightly larger than the worm and the worm gear cavity is only slightly larger than the worm gear.

In a second embodiment, a double speed reducer includes a first solid block of metallic construction and a second solid block of metallic construction having a common width, height, and thickness as the first solid block. The first solid block and said second solid block form a first speed reducer housing when disposed in confronting relation to one another.

A first worm cavity is formed in the first speed reducer housing and a first worm is disposed in the first worm cavity. The first worm is mounted on a first worm shaft.

A first worm gear cavity is formed in the first speed reducer housing and a first worm gear is disposed in the first worm gear cavity in meshing relation to the first worm.

The first worm gear is mounted on a first worm gear shaft and a first worm gear shaft opening is formed in the second solid block to receive the first worm gear shaft.

A first worm shaft bore is formed in the first speed reducer housing. The first worm shaft bore is discontinuous at the first worm cavity. An outer part of the first worm shaft bore extends from the first worm cavity to a first edge wall of the first speed reducer housing and an inner part extends from the first worm cavity to a preselected point in spaced relation to a second edge wall of the first speed reducer housing.

The first worm shaft is positioned in the first worm shaft bore. An outer end of the first worm shaft is adapted to engage an output shaft of a motor means so that the output shaft rotates the first worm shaft and hence the first worm. The first worm rotates the first worm gear and hence the first worm gear shaft.

The double speed reducer further includes a third solid block of metallic construction and a fourth solid block of metallic construction having a common width, height, and thickness as said third solid block. The third solid block and the fourth solid block form a second speed reducer housing when disposed in confronting relation to one another.

The first speed reducer housing and the second speed reducer housing are disposed in abutting relation to one another. More particularly, a front wall of the first speed reducer housing abuts a first edge wall of the second speed reducer housing.

A second worm cavity is formed in the second speed reducer housing and a second worm is disposed in the second worm cavity. The second worm is mounted on a second worm shaft.

A second worm gear cavity is formed in the second speed reducer housing and a second worm gear is disposed in the second worm gear cavity in meshing relation to the second worm.

The second worm gear is mounted on a second worm gear shaft. A second worm gear shaft opening is formed in the fourth solid block to receive the second worm gear shaft.

A second worm shaft bore is formed in the second speed reducer housing. The second worm shaft bore is discontinuous at the second worm cavity and has an outer part extending from the second worm cavity to the first edge wall of the second speed reducer housing and has an inner part extending from the second worm cavity to a preselected point in spaced relation to a second edge wall of the second speed reducer housing.

The second worm shaft is positioned in the second worm shaft bore.

An outer end of the second worm shaft is adapted to engage the first worm gear shaft so that rotation of the first worm gear shaft rotates the second worm shaft and hence the second worm. The second worm rotates the second worm gear and hence the second worm gear shaft. The second worm gear shaft extends through a second worm gear shaft opening formed in the fourth solid block. The second worm gear shaft serves as a power take off shaft for the double speed reducer.

As in the single speed reducer embodiment, gear lash and end play are controlled because the first worm cavity is only slightly larger than the first worm, the first worm gear cavity is only slightly larger than the first worm gear, the second worm cavity is only slightly larger than the second worm, and the second worm gear cavity is only slightly larger than the second worm gear.

The primary object of this invention is to provide a new method for manufacturing speed reducers that eliminates the need to mold individual parts thereof.

A more specific object is to provide a new method where a CNC machine is employed to make a speed reducer.

Another object is to disclose a single speed reducer and a double speed reducer having a worm and worm gear power train where gear lash and end play are both controlled as a benefit of the novel manufacturing method.

Another object of this invention is to provide speed reducers that rely upon worms and worm gears to the exclusion of sprocket gears, sprocket chains, belts, pulleys, and the like.

A closely related object is to provide speed reducers that operate quietly and smoothly.

Another important object is to provide speed reducers employing worms and worm gears that maintain their designed gear lash and end play over many cycles of operation.

Yet another object is to disclose a new way to manufacture worm and worm gear speed reducers in a way that ensures meeting the object of the preceding paragraph.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which:

FIG. 4 is a perspective view of the first housing of the first embodiment;

FIG. 5 is a perspective view of the second housing of the first embodiment;

FIG. 17 is a front elevational view of the first and second housings of the second worm and worm gear assembly of the second embodiment; and FIG. 18 is a perspective view of the first and second housings of the second worm and worm gear assembly depicted in FIG. 17.

DETAILED DESCRIPTION

Figure 1:
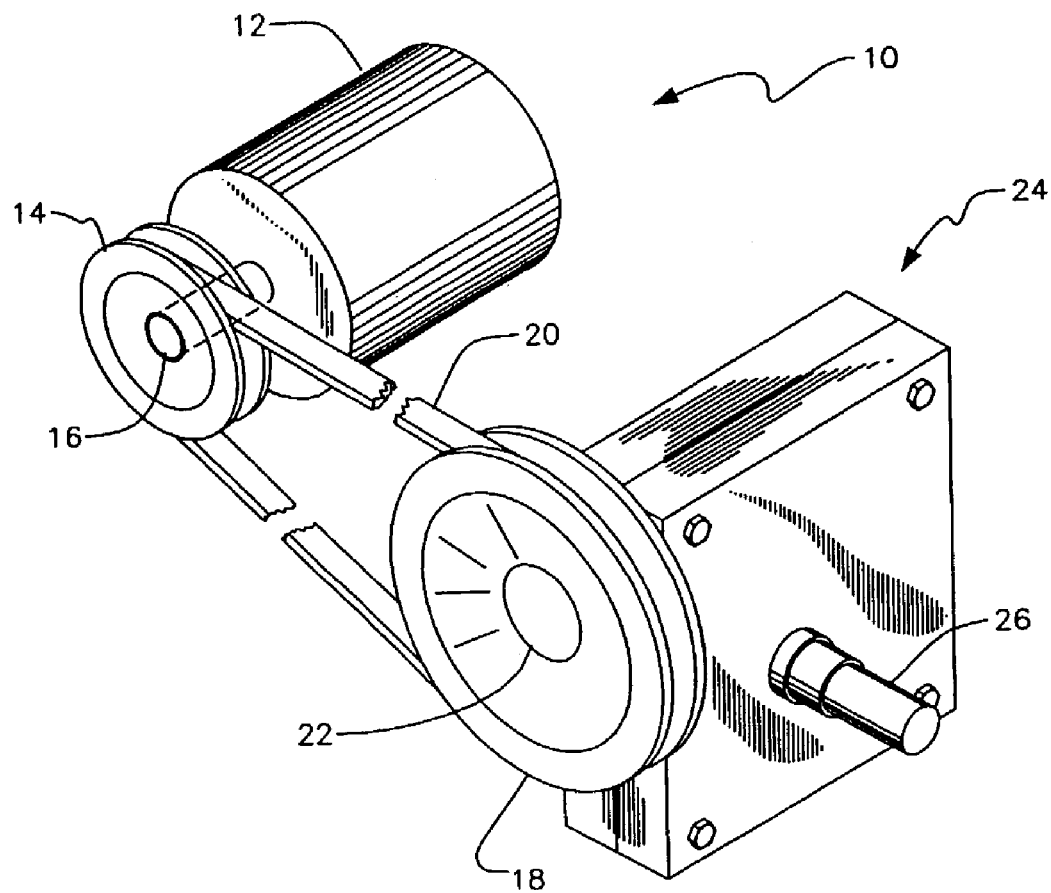
FIG. 1 is a front perspective view of a speed reducer of the prior art.

Referring now to FIG. 1, it will there be seen that a prior art speed reducer assembly of the belt and pulley type is denoted as a whole by the reference numeral 10. Assembly 10 includes motor 12, first pulley 14 mounted on output shaft 16 of said motor, second pulley 18, belt 20 interconnecting first pulley 14 and second pulley 18, pulley shaft 22 that rotates conjointly with second pulley 18, speed reducing gear housing 24 that houses a gear train, not shown, and a power take off shaft 26 that may be employed for many lifting purposes such as, but not limited to, boat lifting.

A safety cover, not shown, is commonly provided to cover belt 20 and pulleys 14, 18.

Speed reducer assemblies of this type have limited lifting capacity due to the slippage of belt 20 with respect to pulleys 14, 18. They also lack a self-locking feature and the lifted item may therefore gradually lower over time due to the phenomena of inertia-generated coasting. Moreover, power increases with speed reduction, but such systems have limited speed reduction and thus limited lifting power.

Figure 2:
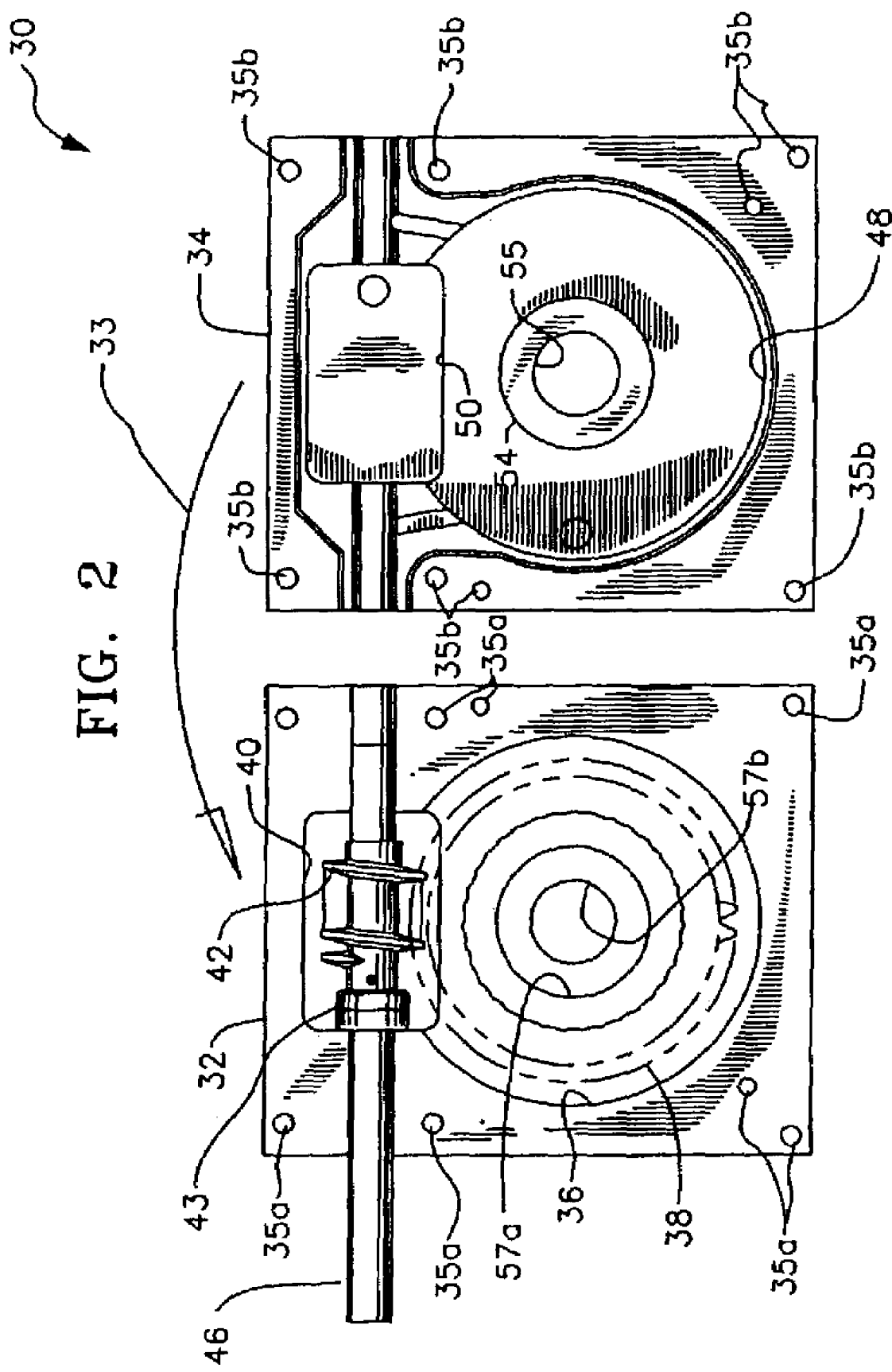
FIG. 2 is a front elevational view of the first and second housings of a first embodiment of the present invention arranged in a first configuration.
Figure 3:
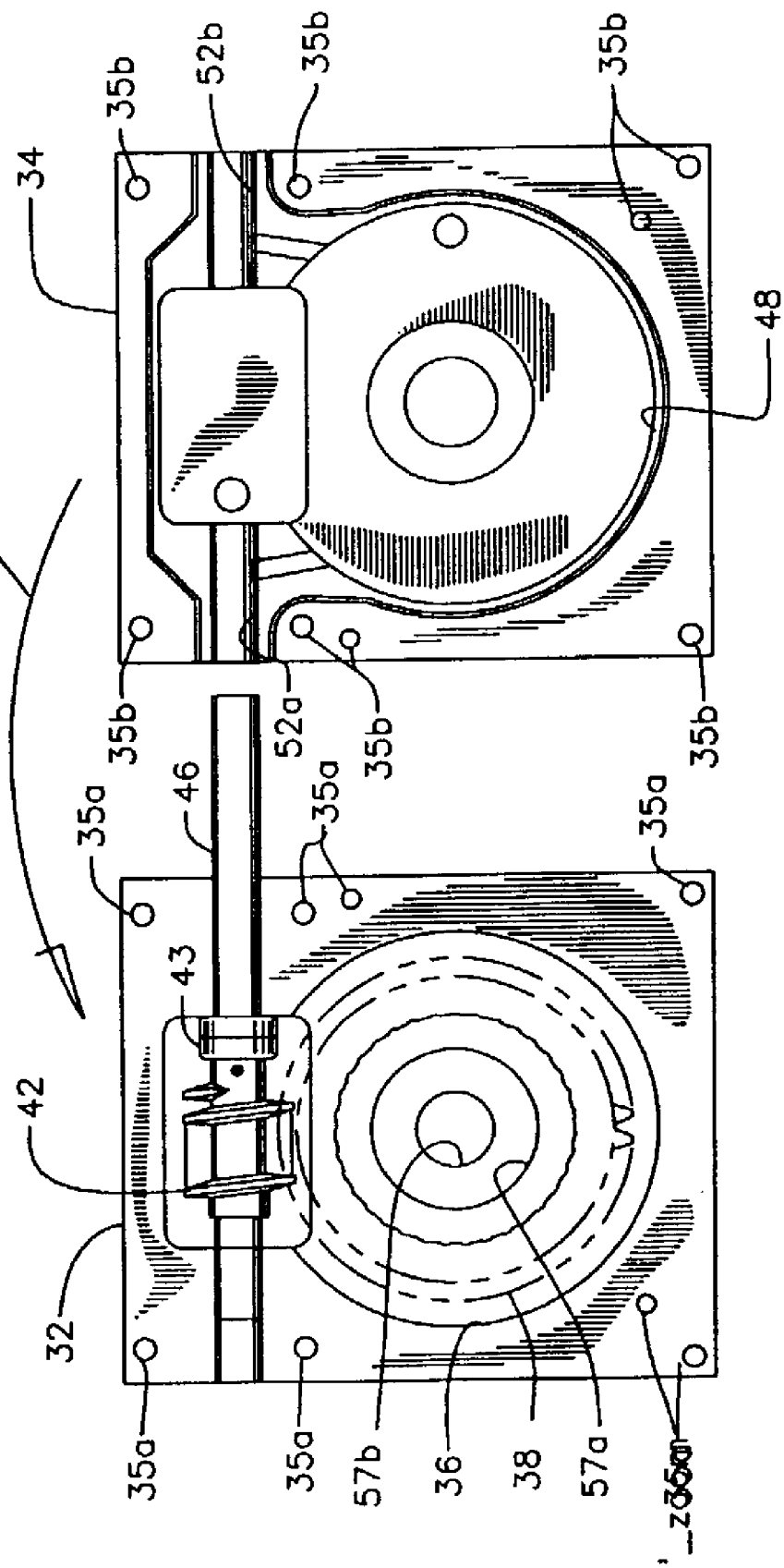
FIG. 3 is a front elevational view of said first and second housings arranged in a second configuration of the first embodiment.
Figure 6:
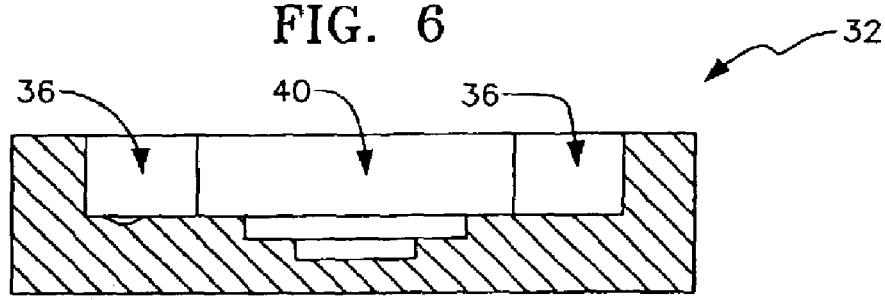
FIG. 6 is a sectional view taken along line 6—6 in FIG. 4.
Figure 7:
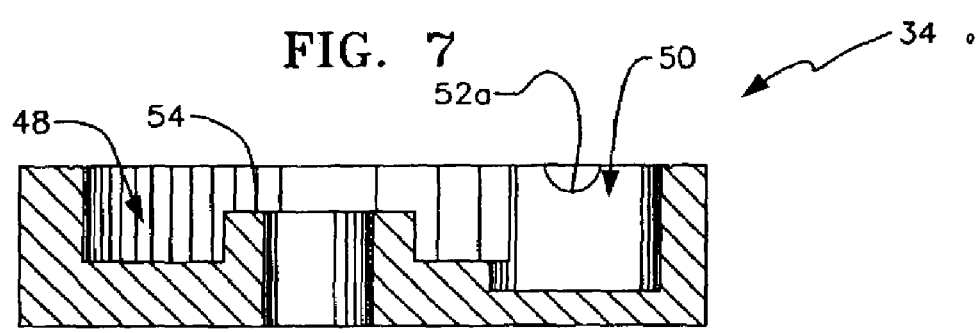
FIG. 7 is a sectional view taken along line 7—7 in FIG. 5.
Figure 8:
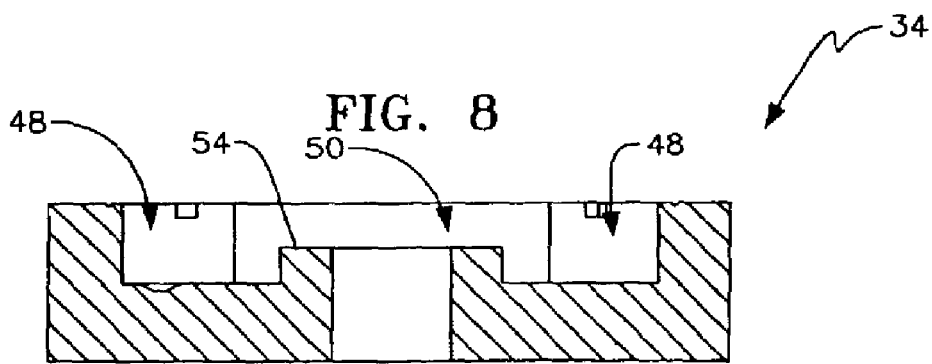
FIG. 8 is a sectional view taken along line 8—8 in FIG. 5.

Referring now to FIGS. 2 and 3, it will there be seen that the reference numeral 30 denotes a first embodiment of the present invention. This first embodiment is a single speed reduction system and employs a single worm and worm gear assembly.

Significantly, as is clear from a comparison of FIGS. 2 and 3, the worm shaft of this first embodiment may be arranged in a first position extending to the left as depicted in FIG. 2 or in a second position extending to the right as depicted in FIG. 3. This flexibility is a function of the off-center mounting of worm 42 relative to worm shaft 46. Worm 42 divides worm shaft 46 into an elongate part and a truncate part. The elongate part of worm shaft 46 extends outwardly from a first side of the speed reducer housing in the configuration of FIG. 2 and outwardly from a second, opposite side of the speed reducer housing in the configuration of FIG. 3. The truncate part of worm shaft 42 is disposed interiorly of single speed reducer 30 in both configurations. If an obstacle is encountered during installation of the novel speed reducer, the novel structure of the speed reducer enables worm shaft 46 to be re-configured and such re-configuration in some cases may enable an installation to be accomplished in a space where it could not have been accomplished but for the off-center mounting and the flexibility thereby provided.

Single speed reducer 30 includes first block 32 and second block 34. As indicated by arcuate assembly arrow 33 in FIGS. 2 and 3, the first and second blocks are placed into juxtaposition with one another to form a housing. Each block begins as a solid metal block and each block is milled to accommodate a worm, a worm shaft, and a worm gear. One of the blocks is milled to include a worm gear shaft opening, as will be fully explained hereinafter.

As best understood by comparing FIGS. 2–4, first housing 32 includes circular worm gear recess 36 formed therein to accommodate worm gear 38, rectangular worm recess 40 to accommodate worm 42 and thrust bearings 43, and a pair of straight worm shaft grooves 44a, 44b (FIG. 4). Rectangular worm recess 40 has a greater depth than that of circular worm gear recess 36. Worm shaft groove 44a accommodates worm shaft 46 when the assembly is in the configuration depicted in FIG. 2, and worm groove 44b accommodates worm shaft 46 when the assembly is in the configuration of FIG. 3. This optional mounting of worm shaft 46 enables an installer increased flexibility when installing single speed reducer 30 in a small space.

As best understood by comparing FIGS. 2–5, second housing 34 has circular worm gear recess 48 formed therein to accommodate worm gear 38, rectangular worm recess 50 to accommodate worm 42 and thrust bearings 43, straight worm shaft grooves 52a, 52b to accommodate worm shaft 46 when in its FIG. 2 and FIG. 3 configurations, respectively, and hub 54 that centers worm gear 38. Rectangular worm recess 50 has a depth greater than that of circular worm gear recess 48.

Hub 54 is centrally apertured to form worm gear shaft opening 55 to accommodate a worm gear shaft, not depicted, that is keyed to worm gear 38 for conjoint rotation therewith. Recess 57a, formed in block 32, accommodates hub 54 and recess 57b, also formed in block 32 in concentric relation to recess 57a, accommodates an innermost end of said unillustrated worm gear shaft.

The unillustrated worm gear shaft extends through worm gear shaft opening 55 and thus extends externally of the housing formed by the juxtapositioning of blocks 32 and 34. Said worm gear shaft is therefore understood to be the power take-off shaft of this single speed reducer.

A plurality of blind bores, collectively denoted 35a in first housing 32 and 35b in second housing 34, receive opposite ends of mounting pins, not shown, that interconnect said first and second housings to one another in sandwiching relation to worm 42 and worm gear 38 when single speed reducer 30 is assembled.

Machining two solid aluminum blocks with a CNC machine preferably forms first and second housings 32 and 34. The gear, shaft, and bearing-accommodating recesses and grooves may thus be machined to a close tolerance, thereby maintaining a designer-preselected gear lash and end play. The recesses and grooves are also sized to accommodate oil seals as may be required.

When first and second housings 32 and 34 are in confronting relation to one another, circular worm gear recesses 36 and 48 collectively form a worm gear cavity. Rectangular worm recesses 40 and 50 collectively form a worm cavity. Worm shaft grooves 44a, 44b and 52a, 52b, collectively form a worm shaft bore that is discontinuous at the worm cavity.

Figure 9:
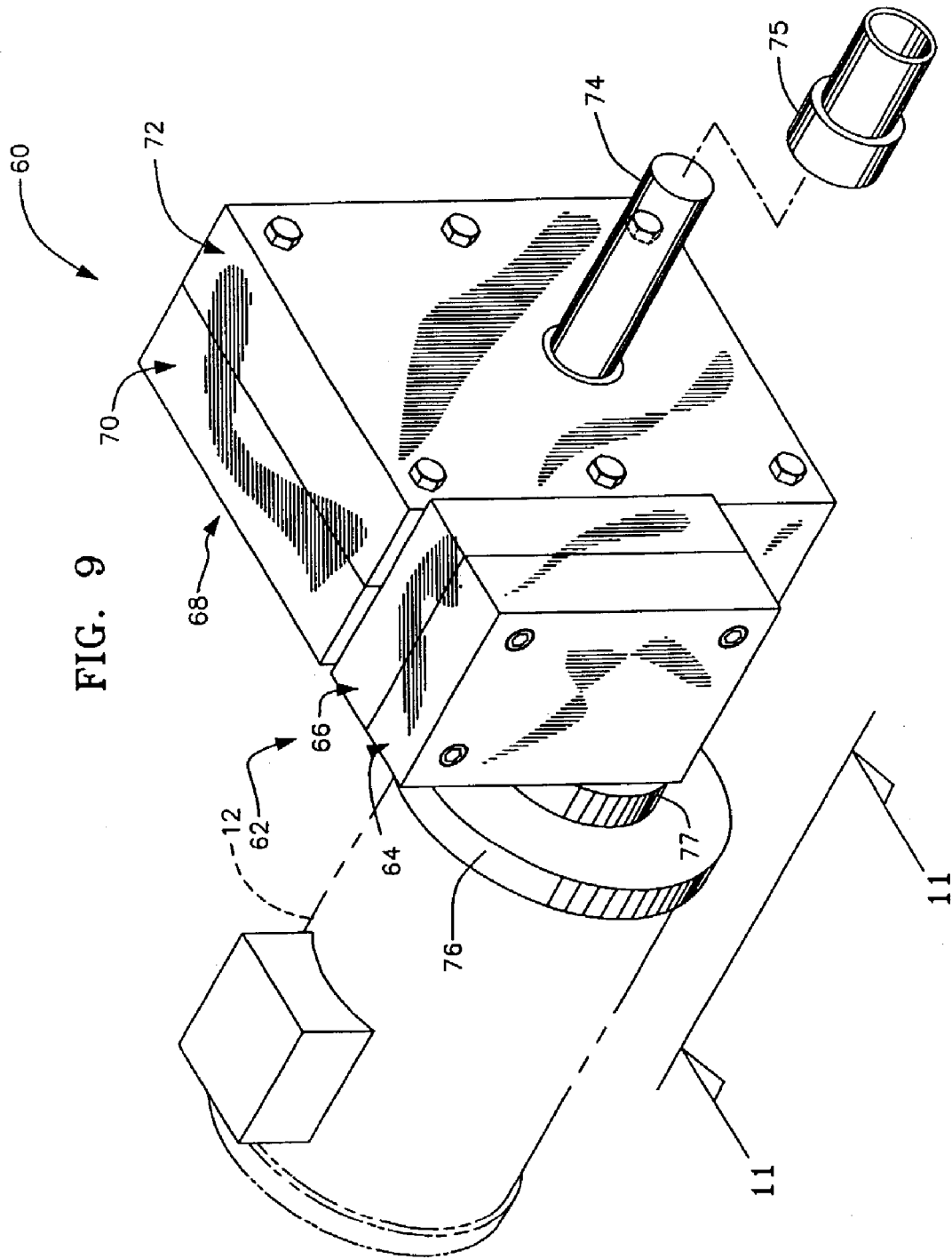
FIG. 9 is a perspective view of a second embodiment.

A second embodiment is denoted as a whole by the reference numeral 60 in FIG. 9. Second embodiment 60 is a double speed reducer. It includes a first speed reducer 62 and a second speed reducer 64.

Figure 11:
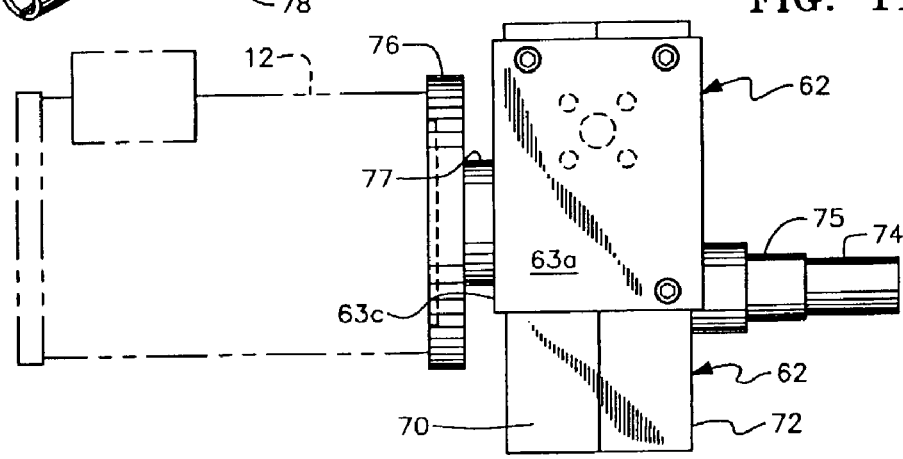
FIG. 11 is a perspective view of said first housing depicted in FIG. 10.
Figure 12:
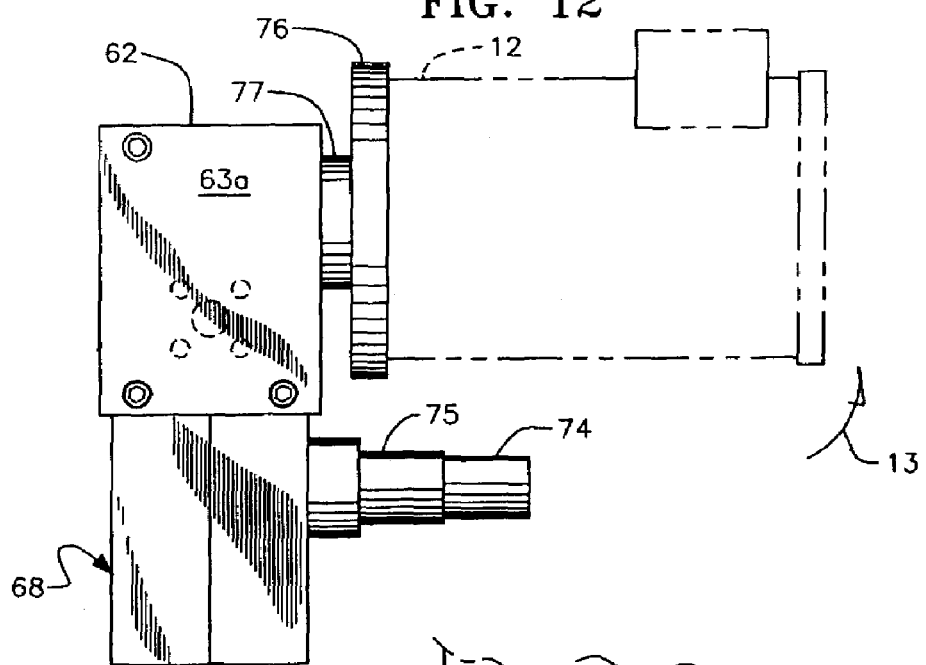
FIG. 12 is a perspective view of said second housing depicted in FIG. 10.
Figure 13:
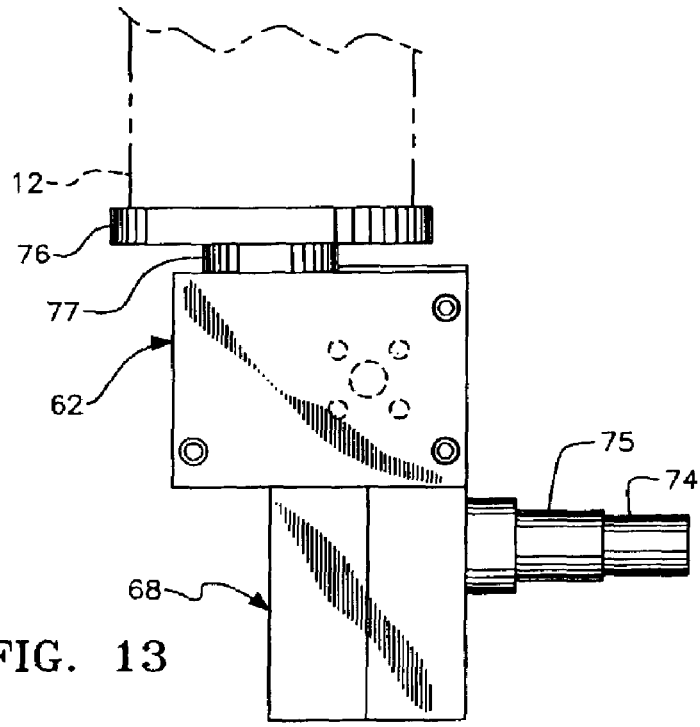
FIG. 13 is a perspective, partially exploded assembly view depicting a first configuration of the motor mount in said second embodiment.

Significantly, double speed reducer 60 has three (3) distinct configurations, thereby facilitating its installment in locations where space may be limited. A first configuration is depicted in FIGS. 9–11, a second configuration is depicted in FIG. 12, and a third configuration is depicted in FIG. 13.

Figure 10:
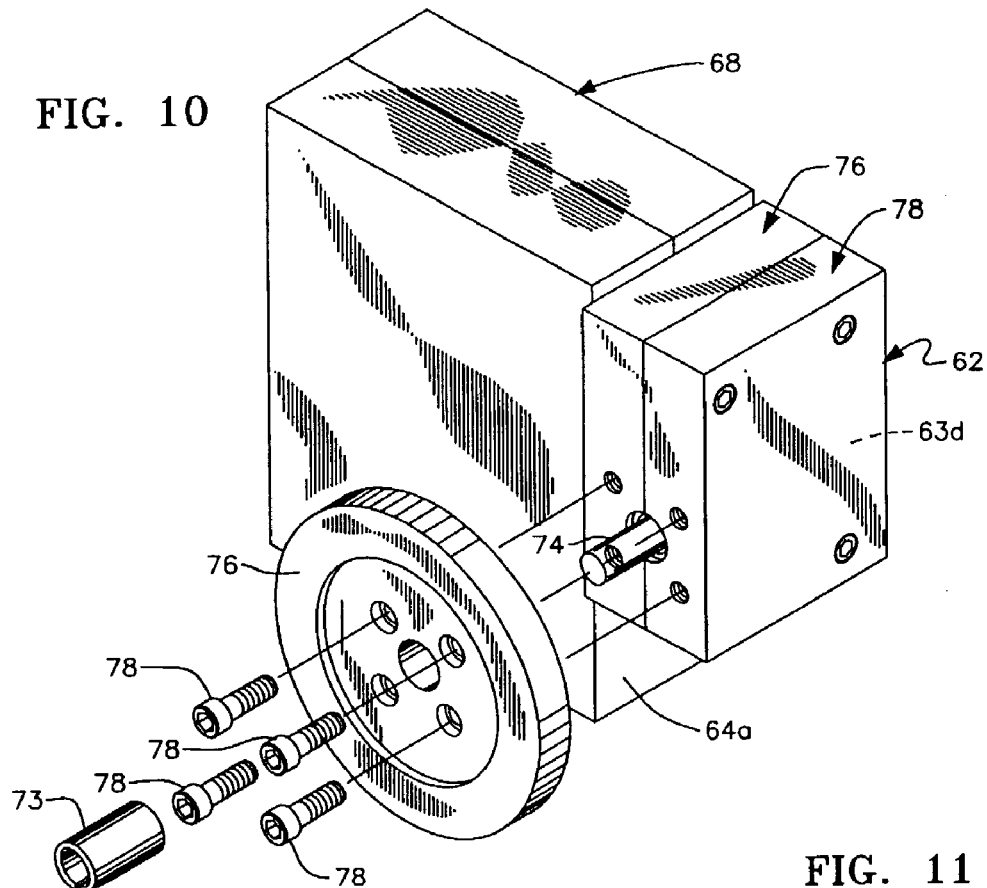
FIG. 10 is a front elevational view of the first and second housings of the first worm and worm gear assembly of the second embodiment arranged in a first configuration.

More particularly, FIG. 1 is a side elevational view of the assembly depicted in FIGS. 9 and 10. FIG. 12 is a side elevational view of a second configuration of double speed reducer 60 where speed reducer 62 is rotated one hundred eighty degrees (180°) from the position thereof in FIGS. 9–11. FIG. 13 is a side elevational view of a third configuration of double speed reducer 60 where speed reducer 62 and motor 12 are rotated ninety degrees (90°) upwardly from the position thereof in FIGS. 9–11 as indicated by directional arrow 13 in FIG. 12.

First speed reducer 62 includes a housing formed of first block 64 and second block 66. Second speed reducer 68 includes a housing formed of first block 70 and second block 72.

Before describing the structure of double speed reducer 60 in detail, a brief overview of its structure is provided in connection with FIG. 9. An output shaft, not shown, of motor 12 is keyed for conjoint rotation with a worm shaft, not shown, that carries a worm. It will be surmised from FIG. 9 that said worm is positioned in a first hollow worm cavity formed when blocks 64 and 66 are placed in confronting relation to one another and that said worm cavity is toward the lower end of speed reducer 62. Moreover, a bore that extends to said cavity to accommodate said worm shaft is formed by a pair of confronting semicircular grooves, not shown in FIG. 9. A second hollow cavity is similarly formed from the juxtaposition of said blocks 64 and 66, said second hollow cavity accommodating a worm gear, also not shown, that is in meshing relation to the worm positioned below it. The worm gear of speed reducer 62 is mounted on a worm gear shaft, not shown, that extends through a worm gear shaft opening formed in block 66. That worm gear shaft is received within a worm gear shaft bore formed in second speed reducer 68, said worm gear shaft bore being formed by a pair of confronting semicircular grooves formed in blocks 70 and 72. The worm gear shaft is keyed for conjoint rotation with a worm-carrying worm shaft that is accommodated within a worm cavity formed in the upper part of speed reducer 68, said cavity being confluent with the worm gear shaft bore that accommodates the worm gear shaft of speed reducer 62 and the worm gear shaft of speed reducer 68. Just below the worm cavity of speed reducer 68 is a worm gear cavity formed by the juxtaposition of blocks 70 and 72. A worm gear positioned within that worm gear cavity is mounted to worm gear shaft 74 that extends through a worm gear shaft opening formed in block 72 of speed reducer 68. Collar 75 is mounted to said worm gear shaft 74. Thus it is understood that worm gear shaft 74 is the power take off shaft for double speed reducer 60. Said shaft 74 rotates slowly but with high torque and as such may be used advantageously in applications where a heavy weight it to be raised or lowered at a relatively slow pace. Boatlifts, for example, often require slow speed and high torque, but the novel apparatus is not limited to boatlift applications.

The means for connecting motor 12 to first reducer 62 is best understood in connection with FIG. 10. Motor mounting plate 76 having hub 77 is secured by a plurality of fastening members, collectively denoted 78, to a sidewall or edge wall of first speed reducer 62 as indicated by the assembly lines. A leading end of coupler 73 ensleeves and engages worm shaft 79 that extends from bore 65 formed in said sidewall of speed reducer 62. A trailing end of coupler 73 ensleeves and engages the output shaft of motor 12 so that rotation of said output shaft imparts simultaneous and corresponding rotation to worm shaft 79.

Figure 14:
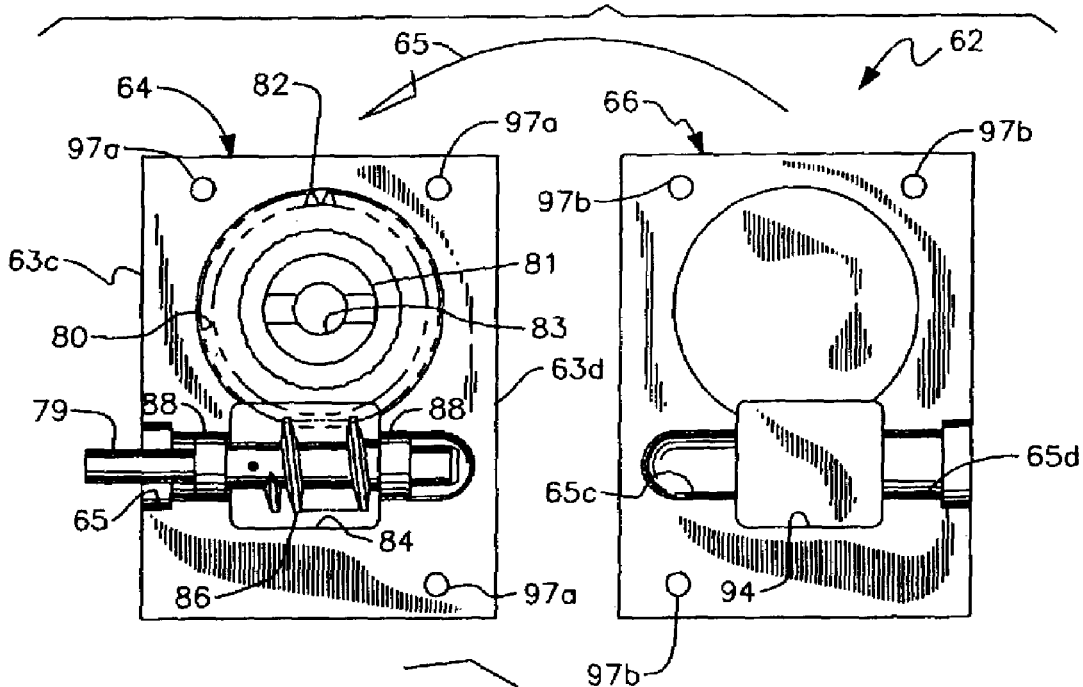
FIG. 14 is an end elevational view of the FIG. 13 embodiment when assembled in a first configuration and with a motor means in phantom lines.
Figure 15:
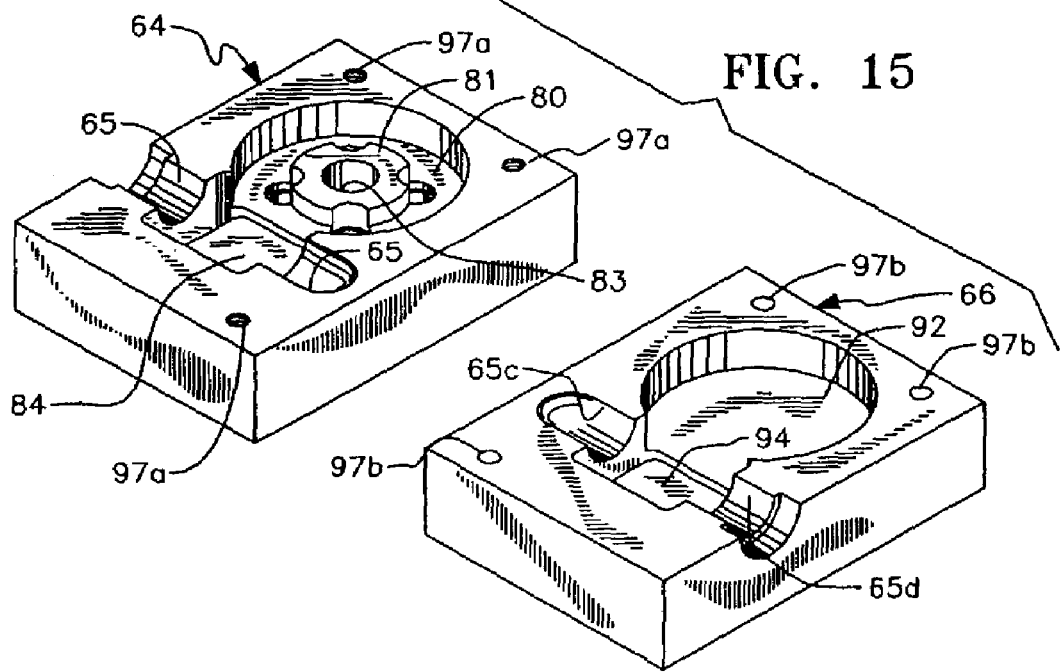
FIG. 15 is an end elevational view of the FIG. 13 embodiment when assembled in a second configuration where the output shaft of the lift extends in the same direction as the motor means.

The construction of speed reducer 62 is further depicted in FIGS. 14 and 15.

Speed reducer 62 includes first solid block 64 and second solid block 66. As indicated by arcuate assembly arrow 65 in FIG. 14, the first and second solid blocks are placed into juxtaposition with one another to complete the assembly.

First block 64 has circular worm gear recess 80 formed therein to accommodate worm gear 82. Hub 81 is centered with respect to circular worm gear recess 80. Hub 81 is centrally apertured as at 83 to accommodate a worm gear shaft that extends into a worm shaft bore, disclosed hereinafter, formed in speed reducer 68.

Rectangular worm recess 84 is formed in first block 64 to accommodate worm 86 and thrust bearings 88 and has a depth greater than the depth of circular worm gear recess 80. Groove 65a is formed in block 64 and its outer end is in open communication with worm shaft bore 65. Its inner, closed end is denoted 65b. Groove 65b is a blind groove, having in outer end in open communication with worm recess 84 and an inner end that accommodates the inner end of worm shaft 79.

Second block 66 has circular worm gear recess 92 formed therein to accommodate worm gear 82, rectangular worm recess 94 to accommodate worm 86 and thrust bearings 88, and straight worm shaft grooves 65c, 65d to accommodate worm shaft 79. Rectangular worm recess 94 has a depth greater than the depth of circular worm gear recess 92.

A plurality of blind bores, collectively denoted 97a in first block 64 and 97b in second block 66, receive opposite ends of mounting pins, not shown, that interconnect said first and second blocks to one another in sandwiching relation to worm 86 and worm gear 82 when housing 62 is assembled.

Machining two solid aluminum blocks with a CNC machine forms first and second blocks 64 and 66. The gear, shaft, and bearing-accommodating recesses and grooves may thus be machined to a close tolerance, thereby maintaining a designer-preselected gear lash and end play. The recesses and grooves are also sized to accommodate oil seals as may be required.

Figure 16:
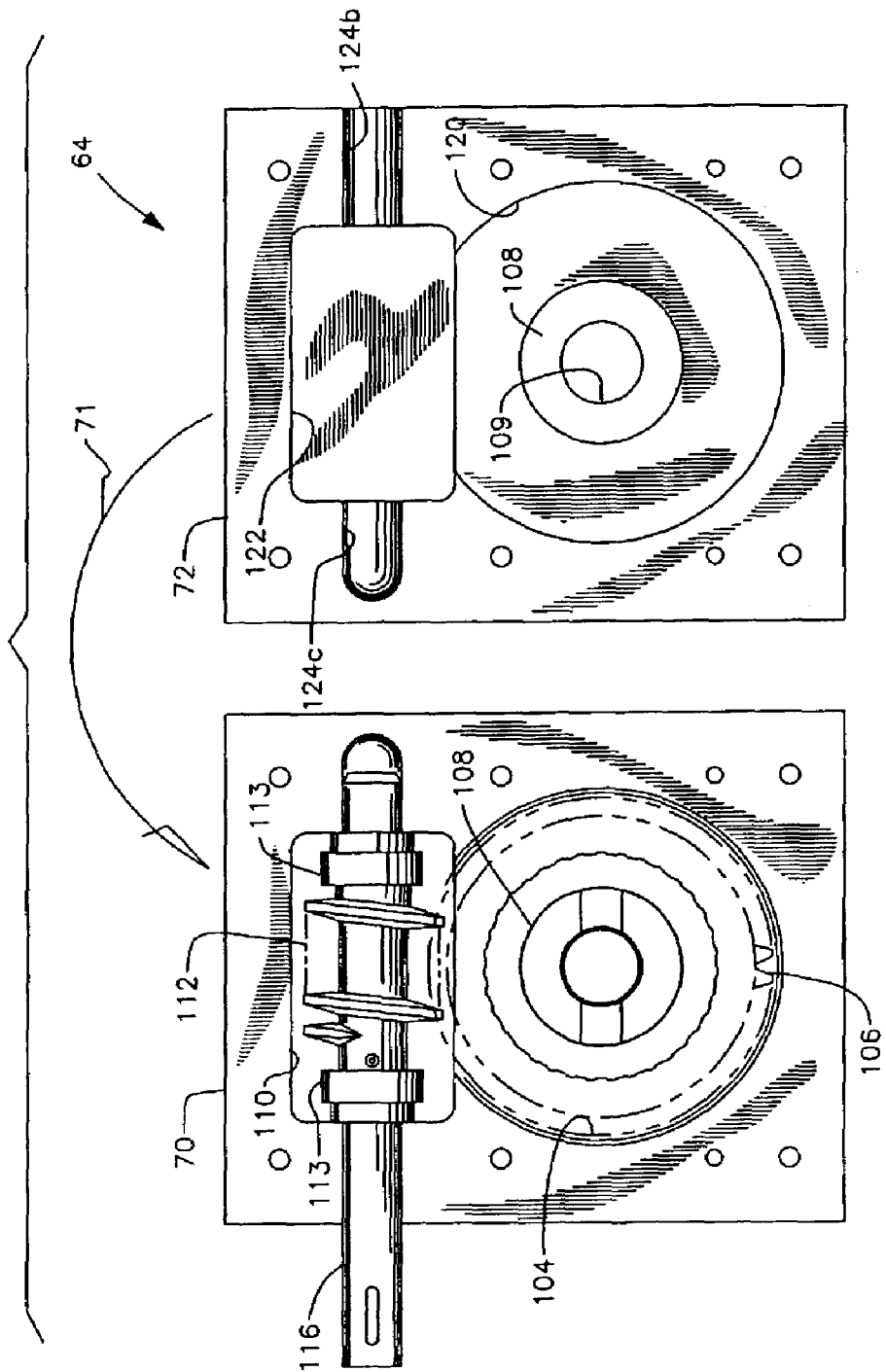
FIG. 16 is an end elevational view of the FIG. 13 embodiment when assembled in a third configuration where the output shaft of the lift extends in a direction perpendicular to the direction of the motor means.

Blocks 70 and 72, depicted in FIGS. 16–18, have a substantially similar construction. They are brought in confronting relation to one another is indicated by arcuate arrow 71 to form second speed reducer 68. Block 70 has circular worm gear recess 104 formed therein to accommodate worm gear 106. In block 72, hub 108 centers said worm gear 106 within said circular worm gear recess 104. Hub 108 is centrally apertured at worm gear shaft opening 109 to accommodate worm gear shaft 74 that serves as the power take off shaft for double speed reducer 60 as mentioned above.

Rectangular worm recess 110 accommodates worm 112 and thrust bearings 113, worm shaft groove 114a (FIG., 17) accommodates a first end of worm shaft 116 and worm shaft groove 114b accommodates a second end of worm shaft 116.

Second housing 72 has circular worm gear recess 120 formed therein to accommodate worm gear 106. Rectangular worm recess 122 accommodates worm 112, worm shaft groove 124a accommodates an inner end of worm shaft 116 and worm shaft groove 124b accommodates an outer end of worm shaft 116.

A plurality of blind bores, collectively denoted 126a in first block 70 and 126b in second block 72, receive opposite ends of mounting pins 127, two of which are depicted in FIG. 18, that interconnect said first and second blocks to one another in sandwiching relation to worm 112 and worm gear 106 when housing 68 is assembled.

Machining two solid aluminum blocks with a CNC machine forms first and second blocks 70 and 72. The gear, shaft, and thrust bearing-accommodating recesses and grooves may thus be machined to a close tolerance, thereby maintaining a designer-preselected gear lash and end play. The recesses and grooves are also sized to accommodate oil seals as may be required.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

The invention claimed is:

1. A single speed reducer, comprising:
a first solid block of metallic construction;
a second solid block of metallic construction having a common width, height, and thickness as said first solid block;
said first solid block and said second solid block forming a speed reducer housing when disposed in confronting relation to one another;
a worm cavity formed in said speed reducer housing;
a worm disposed in said worm cavity;
said worm mounted on a worm shaft in off-center relation to said worm shaft so that said worm shaft has an elongate part and a truncate part;
a worm gear cavity formed in said speed reducer housing;
a worm gear disposed in said worm gear cavity in meshing relation to said worm;
said worm gear mounted on a worm gear shaft;
a worm gear shaft opening formed in said second solid block to receive said worm gear shaft;
a worm shaft bore formed in said speed reducer housing, said worm shaft bore being discontinuous at said worm cavity and having a first part extending from said worm cavity to a first edge wall of said speed reducer housing and having a second part extending from said worm cavity to a second edge wall of said speed reducer housing;
said worm shaft having a first position where said elongate part of said worm shaft extends outwardly from a first side of said speed reducer housing and where said truncate part of said worm shaft is disposed interiorly of said speed reducer housing;
said worm shaft having a second position where said elongate part of said worm shaft extends outwardly from a second side of said speed reducer housing and where said second truncate part of said worm shaft is disposed interiorly of said speed reducer housing;
an outer end of said worm shaft adapted to engage an output shaft of a motor means so that said output shaft rotates said worm shaft and hence said worm, and said worm rotates said worm gear and hence said worm gear shaft;
whereby said worm cavity is only slightly larger than said worm;

whereby said worm gear cavity is only slightly larger than said worm gear; and whereby gear lash and end play are controlled.

2. The single speed reducer of claim 1, further comprising:

fastening means for maintaining said first and second solid blocks in said confronting relation to one another.

3. The single speed reducer of claim 2, wherein said fastening means includes a first plurality of fastening bores formed in said first solid block and a second plurality of fastening bores formed in said second solid block.

4. A double speed reducer, comprising:

a first solid block of metallic construction;

a second solid block of metallic construction having a width, height, and thickness in common with said first solid block;

said first solid block and said second solid block forming a first speed reducer housing when disposed in confronting relation to one another;

a worm-receiving recess formed in said first speed reducer housing;

a first worm shaft bore formed in said first speed reducer housing, said first worm shaft bore being discontinuous at said first worm-receiving recess and having a first part extending from said worm-receiving recess to a first edge wall of said first speed reducer housing and having a second part extending from said worm-receiving recess to a second edge wall of said first speed reducer housing;

a worm gear-receiving cavity formed in said first speed reducer housing;

a first worm received in said worm-receiving cavity;

said first worm mounted in off-center relation to a first worm shaft so that the first worm shaft has an elongate part and a truncate part;

said first worm shaft having a first position where said elongate part of said first worm shaft extends outwardly from a first side of said first speed reducer housing and where said truncate part of said worm shaft is disposed interiorly of said first speed reducer housing;

said first worm shaft having a second position where said elongate part of said first worm shaft extends outwardly from a second side of said first speed reducer housing and where said second truncate part of said first worm shaft is disposed interiorly of said fist speed reducer housing;

a third solid block of metallic construction;

a fourth solid block of metallic construction having a width, height, and thickness in common with said third solid block;

said third solid block and said fourth solid block forming a second speed reducer housing when disposed in confronting relation to one another;

said first speed reducer housing and said second speed reducer housing disposed in abutting relation to one another, a front wall of said first speed reducer housing abutting a first edge wall of said second speed reducer housing;

a worm-receiving cavity formed in said second speed reducer housing;

a worm gear-receiving cavity formed in said second speed reducer housing;

a second worm received in said worm-receiving cavity formed in said second speed reducer housing;

said second worm mounted in off-center relation to a second worm shaft so that the second worm shaft has an elongate part and a truncate part;

said second worm shaft having a first position where said elongate part of said second worm shaft extends outwardly from a first side of said second speed reducer housing and where said truncate part of said second worm shaft is disposed interiorly of said second speed reducer housing; and said second worm shaft having a second position where said elongate part of said second worm shaft extends outwardly from a second side of said second speed reducer housing and where said truncate part of said second worm shaft is disposed interiorly of said second speed reducer housing.

5. The single speed reducer of claim 4, further comprising:

first fastening means for maintaining said first and second solid blocks in said confronting relation to one another; and second fastening means for maintaining said third and fourth solid blocks in said confronting relation to one another.

6. The single speed reducer of claim 5, wherein said fist fastening means includes a first plurality of fastening bores formed in said first solid block and a second plurality of fastening bores formed in said second solid block, and wherein said second fastening means includes a third plurality of fastening bores formed in said third solid block and a fourth plurality of fastening bores formed in said fourth solid block.

7. A double speed reducer, comprising:

a first solid block of metallic construction;

a second solid block of metallic construction having a width, height, and thickness in common with said first solid block;

said first solid block and said second solid block forming a first speed reducer housing when disposed in confronting relation to one another;

a first worm cavity formed in said first speed reducer housing;

a first worm disposed in said first worm cavity, said first worm mounted on a first worm shaft;

said first worm mounted on said first worm shaft in off-center relation thereto so that said first worm shaft has an elongate part and a truncate part;

a first worm gear cavity formed in said first speed reducer housing;

a first worm gear disposed in said first worm gear cavity in meshing relation to said first worm;

said first worm gear mounted on a first worm gear shaft;

a first worm gear shaft opening formed in said second solid block to receive said first worm gear shaft;

a first worm shaft bore formed in said first speed reducer housing, said first worm shaft bore being discontinuous at said first worm cavity and having au outer part extending from said first worm cavity to a first edge wall of said first speed reducer housing and having an inner part extending from said first worm cavity to a preselected point in spaced relation to a second edge wall of said first speed reducer housing;

said first worm shaft positioned in said first worm shaft bore;

said first worm shaft having a first position in said first worm shaft bore where said elongate part of said first worm shaft extends outwardly from a first side of said first speed reducer housing and where said truncate part of said worm shaft is disposed interiorly of said first speed reducer housing;

said first worm shaft having a second position in said first worm shaft bore where said elongate part of said first worm shaft extends outwardly from a second side of said first speed reducer housing and where said second truncate part of said first worm shaft is disposed interiorly of said first speed reducer housing;

an outer end of said first worm shaft adapted to engage an output shaft of a motor means so that said output shaft rotates said first worm shaft and hence said first worm, and said first worm rotates said first worm gear and hence said first worm gear shaft;

a third solid block of metallic construction;

a fourth solid block of metallic construction having a width, height, and thickness in common with said third solid block;

said third solid block and said fourth solid block forming a second speed reducer housing when disposed in confronting relation to one another;

said first speed reducer and said second speed reducer housing disposed in abutting relation to one another, a front wall of said first speed reducer housing abutting a first edge wall of said second speed reducer housing;

a second worm cavity formed in said second speed reducer housing;

a second worm disposed in said second worm cavity, said second worm mounted on a second worm shaft;

said second worm mounted on said second worm shaft in off-center relation thereto so that said second worm shaft has an elongate part and a truncate part;

a second worm gear cavity formed in said second speed reducer housing;

a second worm gear disposed in said second worm gear cavity in meshing relation to said second worm;

said second worm gear mounted on a second worm gear shaft;

a second worm gear shaft opening formed in said fourth solid block to receive said second worm gear shaft;

a second worm shaft bore formed in said second speed reducer housing, said second worm shaft bore being discontinuous at said second worm cavity and having an outer part extending from said second worm cavity to said first edge wall of said second speed reducer housing and having an inner part extending from said second worm cavity to a preselected point in spaced relation to a second edge wall of said second speed reducer housing;

said second worm shaft positioned in said second worm shaft bore;

said second worm shaft having a first position in said second worm shaft bore where said elongate part of said second worm shaft extends outwardly from a first side of said second speed reducer housing and where said truncate part of said second worm shaft is disposed interiorly of said second speed reducer housing;

said second worm shaft having a second position in said second worm shaft bore where said elongate part of said second worm shaft extends outwardly from a second side of said second speed reducer housing and where said second truncate part of said second worm shaft is disposed interiorly of said second speed reducer housing; and an outer end of said second worm shaft adapted to engage said first worm gear shaft so that rotation of said first worm gear shaft rotates said second worm shaft and hence said second worm and said second worm rotates said second worm gear shaft, said second worm gear shaft extending through said second worm gear shaft opening formed in said fourth solid block and said second worm gear shaft serving as a power take off shaft for said double speed reducer.

* * * * *